W. W. GOODWIN.
Gas-Light and Pressure Indicators.
No. 138,016. Patented April 22, 1873.
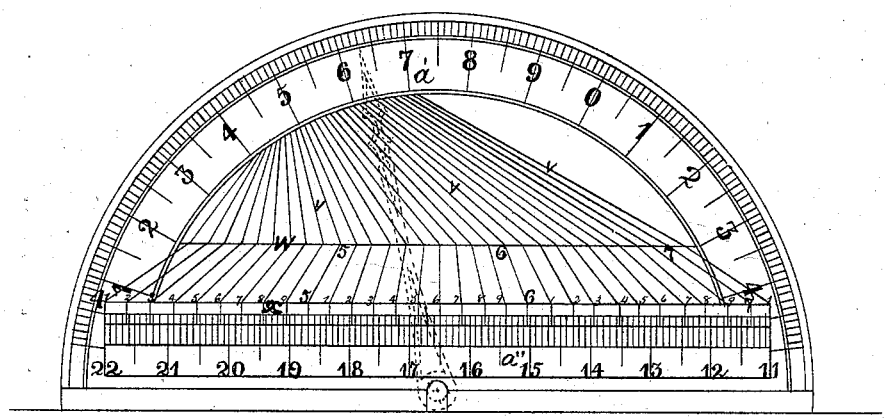
WITNESSES:
INVENTOR:

UNITED STATES PATENT OFFICE.

WILLIAM W. GOODWIN, OF CAMDEN, NEW JERSEY.

IMPROVEMENT IN GAS LIGHT AND PRESSURE INDICATORS.

Specification forming part of Letters Patent No. 138,016, dated April 22, 1873; application filed August 9, 1871.

*To all whom it may concern:*

Be it known that I, WILLIAM WALLACE GOODWIN, of Camden, in the State of New Jersey, have invented a certain Improvement in Photometers, of which the following is a specification:

Nature and Objects of the Invention.

My improvement relates more especially to the English jet photometer of Lowe, as adapted by Kirkham and Sugg to the latter gentleman's theory—viz., "maintaining a seven-inch flame from an orifice of certain fixed dimensions, the illuminating power of gas is in direct proportion inversely as the pressure." Experimenting upon this theory they found that at .63 pressure 14-candle gas with their standard jet gave a flame seven inches in height; that 12-candle gas required .685 pressure to give the same height of flame; that 16-candle gas gave the standard flame at .575 pressure; that 20-candle gas gave the standard flame at .465 pressure; and so on for all other qualities of gas within the range required. With the results of these experiments a diagram was constructed on a large sheet of paper ruled off in horizontal and vertical lines, the one set corresponding with the illuminating power of the gas in candles, the other set corresponding with the pressure required to give a seven-inch flame; and to ascertain the exact illuminating power of any gas which may be burning in the said photometer it is only necessary to adjust the height of the flame precisely to the seven inches and note the pressure indicated on the arched index-scale of the photometer and then to refer to the special crossing-lines of the diagram on the paper sheet to read off the answer in sperm candles. But, however accurate and reliable the said diagram may be constructed for the purpose, it is objectionable in that it is necessarily entirely separate from the meter, and, therefore, requires the inspector to leave the photometer in order to inspect the diagram to ascertain the quality of the gas which is burning as a seven-inch column in the photometer. These two separate and distinct inspections are especially objectionable to the superintendent or workman who has charge of the gas-generators, in that they require two separate inspections to arrive at one result—*i. e.*, a knowledge of the quality and requirements of the gas being tested in the said photometer.

The object of my invention is to remedy this objectionable feature in Kirkham and Sugg's diagram in its relation to their improvement in Lowe's photometers in such a manner that a simple inspection of two connecting scales on the front of the photometer will show at once both the pressure and the number of candles to which the quality of the gas is equivalent. This I accomplish by the combination with the pressure-scale and index of a photometer of a scale showing the number of candles corresponding with any pressure required to support the predetermined height of the jet-flame in the said photometer in such a manner that the two scales can be inspected together at once and the results sought for be ascertained thereby in a moment.

Description of the Accompanying Drawing.

A is a semicircular plate of metal having the arched scale of pressure $a'$ constructed thereon with its divisions and numbers arranged in the same manner as in the photometer improved by Kirkham and Sugg, and with the usual scale-pointer (indicated by the dotted lines in the drawing) to point to the particular pressure required to support the predetermined height of the gas-flame in the photometer. (Not shown.)

General Description.

Along the face of the straight edge of the plate A I construct the candle-scale $a''$ by dividing the whole length of its upper half into spaces corresponding with the divisions of tenths, from .41 to .71, inclusive, on the pressure-scale $a'$; and, for the purpose of enlarging the angles at the intersection of the lines $v\ v$, which connect the two scales $a'$ and $a''$, I construct a line, $w$, parallel with and at about an inch, more or less, above the candle-scale $a'''$, divide it into tenths corresponding with the tenths which are included between .41 and .71 of the arched pressure-scale $a'$, and then continue the said lines $v\ v$ so as to divide the horizontal line $x$ into exactly the same number of parts and number them, left to right, to correspond with those on the curved scale $a'$ from .41 to .71. These lines, forming the divisions of tenths on the line $x$, I extend perpendicularly downward into the divisions of hundredths, into which the upper part of the candle-scale $a''$ is divided. I now divide the whole length of the lower half of the candle-scale $a''$ into eleven equal parts and number them respectively from 11 to 22, inclusive, counting from right to left, in accordance with the fact before mentioned that "maintaining a seven-inch flame from an orifice of certain fixed dimensions, the illuminating power of gas is in direct proportion inversely as the pressure;" and, finally, I then divide the upper portion of each of the eleven spaces of the candle-scale $a''$ into tenths, making 110 parts, and also extend the said division-lines into the pressure-scale, thus showing the exact value of the pressure required for any desired number of candles.

By calculations I found that 1.1 candle-power corresponds with .03 pressure, as per the following table, viz:

| | | | |
|---|---|---|---|
| .4100 | inch pressure equals | 22. | candles. |
| .4127 | " " " | 21.9 | " |
| .4154 | " " " | 21.8 | " |
| .4182—.4181+1 | " " " | 21.7 | " |
| .4208 | " " " | 21.6 | " |
| .4235 | " " " | 21.5 | " |
| .4262 | " " " | 21.4 | " |
| .4291—.4289+2 | " " " | 21.3 | " |
| .4316 | " " " | 21.2 | " |
| .4343 | " " " | 21.1 | " |
| .4370 | " " " | 21. | " |
| .4400—.4397+3 | " " " | 20.9 | " |

Hence, it will be seen that the value in pressure required to give one tenth of a candle is .0027 of an inch; and if the question be asked, for instance, what pressure is required to give 21.3 candles? the answer shown on the scale $a'$ is .4291 exactly, or approximately .43, and it can be seen and read off in a moment; whereas, by Kirkham and Sugg's arrangement, the answer could not be found as quickly nor as correctly.

Now, as my candle-scale $a''$ is constructed and numbered in relation to the pressure-scale $a'$, in accordance with Kirkham and Sugg's theory, it will be understood without further explanation that whatever pressure the hand may point out on the scale $a'$ the number of candles indicative of the illuminating power of the gas which may be burning in the photometer will be found by a momentary inspection of the scale $a''$.

Claim.

I claim as my invention—

In photometers, the combination of the two scales $a'$ and $a''$ with the index, as shown in the drawing, for the purpose hereinbefore set forth.

WM. WALLACE GOODWIN.

Witnesses:
BENJ. MORISON,
WM. H. MORISON.